United States Patent [19]

Frank

US005783069A

[11] Patent Number: 5,783,069
[45] Date of Patent: *Jul. 21, 1998

[54] PACKING ELEMENTS

[75] Inventor: Charles Roger Frank, Cumbria, United Kingdom

[73] Assignee: Mass Transfer International Ltd., Cumbria, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 611,623

[22] Filed: Mar. 6, 1996

[30] Foreign Application Priority Data

Mar. 9, 1995 [GB] United Kingdom ............... 9504784

[51] Int. Cl.[6] ................................................. B01F 3/04
[52] U.S. Cl. ..................... 210/150; 261/94; 261/DIG. 72
[58] Field of Search .................... 261/DIG. 72, 94, 261/98; 210/150

[56] References Cited

U.S. PATENT DOCUMENTS

| | | | |
|---|---|---|---|
| 1,293,270 | 2/1919 | Webb | 261/DIG. 72 |
| 1,676,451 | 7/1928 | Lilge | 261/DIG. 72 |
| 1,715,252 | 5/1929 | Sperr, Jr. | 261/DIG. 72 |
| 2,739,118 | 3/1956 | Carey | 261/DIG. 72 |
| 3,574,658 | 4/1971 | Messing | 210/304 |
| 3,957,931 | 5/1976 | Ellis et al. | 261/98 |
| 5,242,626 | 9/1993 | Oshima | 261/DIG. 72 |

FOREIGN PATENT DOCUMENTS

| | | |
|---|---|---|
| 401430 | 12/1990 | European Pat. Off. . |
| 0575314 | 10/1994 | European Pat. Off. . |
| 2293402 | 7/1976 | France . |
| 2679547 | 1/1993 | France . |
| 6811196 | 12/1968 | German Dem. Rep. . |
| 212393 | 8/1984 | German Dem. Rep. . |
| 212826 | 8/1984 | German Dem. Rep. . |
| 215186 | 10/1984 | German Dem. Rep. . |
| 218782 | 2/1985 | German Dem. Rep. . |
| 218783 | 2/1985 | German Dem. Rep. . |

(List continued on next page.)

OTHER PUBLICATIONS

*Patent Abstracts of Japan*, vol. 008, No. 187 (C–240), 28 Aug. 1984 & JP 59 083920 A. May 15, 1984.

DE 032869 (Abstract)–Linde A.G., Anaerobic Biological Treatment of Sewage in Reactor with Filing of Macroporous Carrier for Microorganisms.

Sequencing Batch Reactors an Overview (K.L. Norcross, 16th Biennial Conference of IAWPRC).

Nutrient Removal for Marine Disposal –IWEM 87 Conference Paper, pp. 191–199 Harremoes.

Wat. Sci. Tech. vol. 22 No. 1/2 pp. 171–192 1990 –Concepts and Models for Biofilm Reactor Performance –Arvin and Harremoes.

Wat. Sci. Tech. vol. 31 pp. 173–183, 1995 Technology of membrance Biofilm Reactors operated under Periodically Changing Process Conditions –Wilderer.

gwf–wasser/abwasser 124 (1983) H.5 –May 1983. Belebungsverfahren mit Schaumstoffkopen zur Aufkonzentrierung von Bionmasse Hegemann und Erich Englmann.

Wat. Res. vol. 30 No. 2, pp. 277–284, 1996 –Simultaneous Nitrification and Denitrification in Bench–Scale Sequencing Batch Reactors ( Munch, Lant and Keller).

Derwent WPI Acc No. 88–268760/38 & JP 630197600A (Furukawa Electric Co.) (Abstracts).

Derwent WPI Acc No. 84–298595/48 & JP 590186698A (Takeshita) (Abstracts).

*Primary Examiner*—Tim R. Miles
*Attorney, Agent, or Firm*—Ostrolenk, Faber, Gerb & Soffen, LLP

[57] ABSTRACT

A packing element for use as a biofilm support in the biological processing of liquids. The packing element has a hollow cylindrical body having a plurality of helical blade members extending generally radially from the cylindrical body. A plurality of such packing elements are placed in a vessel. When liquid and/or gas flows over them, they tend to rotate causing local turbulence with resulting improvement in diffusion of gas and/or substrate to and from the biofilm, giving enhanced rates of liquid processing.

13 Claims, 2 Drawing Sheets

FOREIGN PATENT DOCUMENTS

| | | | |
|---|---|---|---|
| 220350 | 3/1985 | German Dem. Rep. | |
| 220351 | 3/1985 | German Dem. Rep. | |
| 220630 | 4/1985 | German Dem. Rep. | |
| 221767 | 5/1985 | German Dem. Rep. | |
| 230092 | 11/1985 | German Dem. Rep. | |
| 142727 | 12/1985 | German Dem. Rep. | |
| 200996 | 12/1985 | German Dem. Rep. | |
| 201166 | 12/1985 | German Dem. Rep. | |
| 231672 | 1/1986 | German Dem. Rep. | |
| 134659 | 4/1986 | German Dem. Rep. | |
| 240788 | 11/1986 | German Dem. Rep. | |
| 241176 | 11/1986 | German Dem. Rep. | |
| 205310 | 12/1986 | German Dem. Rep. | |
| 205559 | 12/1986 | German Dem. Rep. | |
| 241797 | 12/1986 | German Dem. Rep. | |
| 241798 | 12/1986 | German Dem. Rep. | |
| 148317 | 1/1987 | German Dem. Rep. | |
| 207557 | 1/1987 | German Dem. Rep. | |
| 242912 | 2/1987 | German Dem. Rep. | |
| 243355 | 2/1987 | German Dem. Rep. | |
| 243999 | 3/1987 | German Dem. Rep. | |
| 245304 | 4/1987 | German Dem. Rep. | |
| 245836 | 5/1987 | German Dem. Rep. | |
| 246854 | 6/1987 | German Dem. Rep. | |
| 248445 | 8/1987 | German Dem. Rep. | |
| 248826A | 8/1987 | German Dem. Rep. | |
| 249109 | 8/1987 | German Dem. Rep. | |
| 249132 | 8/1987 | German Dem. Rep. | |
| 249574 | 9/1987 | German Dem. Rep. | |
| 250801 | 10/1987 | German Dem. Rep. | |
| 251217 | 11/1987 | German Dem. Rep. | |
| 251219 | 11/1987 | German Dem. Rep. | |
| 252256 | 12/1987 | German Dem. Rep. | |
| 253102 | 1/1988 | German Dem. Rep. | |
| 253373 | 1/1988 | German Dem. Rep. | |
| 253414 | 1/1988 | German Dem. Rep. | |
| 231672 | 2/1988 | German Dem. Rep. | |
| 254484 | 2/1988 | German Dem. Rep. | |
| 255624 | 4/1988 | German Dem. Rep. | |
| 257609 | 6/1988 | German Dem. Rep. | |
| 266920 | 4/1989 | German Dem. Rep. | |
| 277796 | 4/1990 | German Dem. Rep. | |
| 248826B | 5/1990 | German Dem. Rep. | |
| 290729 | 6/1991 | German Dem. Rep. | |
| 293383 | 8/1991 | German Dem. Rep. | |
| 1950754 | 10/1968 | Germany. | |
| 3313500 | 1/1984 | Germany. | |
| 1336034 | 11/1971 | Norway. | |
| 0674774 | 7/1979 | U.S.S.R. | 261/DIG. 72 |
| 0940817 | 7/1982 | U.S.S.R. | 261/DIG. 72 |
| 1333386 | 8/1987 | U.S.S.R. | 261/DIG. 72 |
| 492814 | 9/1938 | United Kingdom. | |
| 502516 | 3/1939 | United Kingdom. | |
| 859298 | 1/1961 | United Kingdom. | |
| 1430233 | 3/1976 | United Kingdom. | |
| 1483332 | 8/1977 | United Kingdom. | |
| 1498173 | 1/1978 | United Kingdom. | |
| 2124412 | 2/1984 | United Kingdom. | |
| 2132044 | 10/1986 | United Kingdom. | |
| 8505287 | 12/1985 | WIPO. | |
| 9111396 | 8/1991 | WIPO. | |

PACKING ELEMENTS

BACKGROUND OF THE INVENTION

The present invention relates to packing elements for use in a method of biological processing of water or other liquids.

In the biological processing of water or other liquids, bacterial or other microbial cultures are used to convert substrates such as pollutants or organic matter suspended or dissolved in the liquid. Typical applications include the removal of carbonaceous, nitrogenous and phosphatic compounds from waste water and biosynthetic processes. The cultures are commonly in the form of a thin film (a biofilm) supported on a biofilm support. The biofilm support may comprise a plurality (sometimes thousands or millions) of small packing elements, normally identical.

The packing elements are normally shaped to give a large surface area to volume ratio, to give good liquid flow, and may comprise a cylindrical body of circular cross section having a plurality of blade members extending therefrom, as shown in WO 85/05287.

A number of problems are encountered with such elements. They can pack together so that the flow spaces (voidage) between them are too small for good liquid flow, substrate distribution and bacterial growth, i.e. they can occlude one another. They can clog up with biofilm in biological processes if the biofilm becomes too thick. It is difficult to design a packing element which is easy to manufacture but which gives good local contact between the biofilm and the liquid.

The present invention sets out to provide a packing element which solves the above-mentioned problems.

SUMMARY OF THE INVENTION

According to the invention, there is provided a packing element for use in a method of biological processing of a liquid, comprising a hollow cylindrical body having a plurality of helical blade members extending generally radially from the cylindrical body.

The packing elements are preferably small. That is, a plurality (thousands to millions, for example) of preferably generally identical packing elements may be used in a biological reactor vessel to provide a sufficiently large surface for biofilm.

Preferably, the overall diameter (i.e. the distance from the axis of the body to the outermost part of the blades) is more than 10 mm and less than 150 mm, more preferably it is in the range 20 to 50 mm. The actual size of the packing elements used depends upon the intended use.

To be suitable for use in a method of biological processing of liquids, the elements preferably have good compatibility with biofilm to be used.

The treatment methods for which the packing element may be used include aerobic or anaerobic methods, for example removal of organic substances (for example in waste water treatment), removal of ammonia by oxidation to nitrite and/or nitrate through nitrification processes, removal of nitrogen by reduction of nitrite and nitrate through denitrification processes, aerobic/anaerobic phosphorous removal processes and other biotechnical conversions of substrates, for example in biosynthesis methods for manufacturing chemicals (particularly, fine chemicals and pharmaceuticals) by the use of microorganisms.

The packing elements may be made of a variety of materials, including metal such as stainless steel or ceramic but are preferably made of polymeric material, for example polypropylene.

The blade members are helical, that is, they lie generally on a helix coaxial with the cylindrical body. They can be curved, to follow the helix, or they may be straight, lying generally at a non-right angle to the axis of the hollow cylindrical body.

The blade members preferably extend axially from the top of the cylindrical body to the bottom, but could be shorter.

The pitch of the helix may be about one turn in from three to five diameters. The blades preferably extend a radial distance more than 0.25 and less than 1.5 times, preferably about 0.5 times the diameter of the cylindrical body. This cylindrical body may be of size 5–75 mm in diameter.

The spacing of the outwardly extending blade members is preferably arranged to give spaces of sufficient size to prevent clogging of the spaces by biofilm. Typically, for a packing element of diameter 20–100 mm, there will be more than 4 and less than 12 blade members, preferably from 6 to 8.

The blade members have circumferentially extending edges. If these are sharp, the packing element will give particularly good turbulent flow at the edges, as set out below.

Preferably, there are blade members extending generally axially outwardly from the cylindrical body. They may additionally or alternatively extend inwards. Outwardly extending blade members help to prevent dense packing of the packing elements to form masses of poor porosity, as the blades of adjacent packing elements tend to prevent nesting and cannot lock, being helical.

The outwardly extending blade members also serve to protect biofilm formed on the outside of the cylindrical body and on the bases of the blade members.

The packing element is preferably of height to diameter ratio more than 1:1 and less than 1:4, preferably in the range 1:1.5 to 1:2.5, most preferably about 1:2.

The density of the packing element material will preferably be in the range 0.9–1.6 Kg/dm$^3$.

The material from which the elements are made will be of a thickness determined by the material used. In the case of polymeric material, the thickness will be about 0.25–2 mm.

The packing elements are preferably produced by extrusion of material through a die have helically extending channels for defining the blade members or having a rotatable die whose rate of rotation is matched to the rate of extrusion, to form blade members of suitable size.

The tube thus extruded is then cut into sections.

The elements are open-ended, to give good flow through the body. The packing element configuration can give a high surface area to volume ratio (particularly in the range 200–600 m$^2$/m$^3$), thereby reducing the bioreactor volume required.

The configuration described above gives a high voidage (i.e. proportion of void space) in the elements. This facilitates a completely mixed environment within a liquid, with a low potential for biofilm occlusion and with minimal flow resistance.

The packing elements are preferaby used in a method of liquid treatment comprising the steps of placing a plurality of the packing elements in a vessel, flowing liquid through the reactor, and allowing biofilm to grow on the packing elements.

The liquid may flow intermittently or continuously through the reactor. It may flow from the top or from the bottom or from side to side. Aerobic treatment processes will necessitate flow of air or oxygen over the packing elements, for example by bubbling of air or oxygen up through the reactor or by natural draught over the packing elements.

The flow of liquid and/or gas over the blade members tends to cause the packing elements to rotate about their axes.

This has the following unexpected highly beneficial effects.

Very high local turbulence flow can be generated. The rotational movement tends to break up stagnant boundary layers and enhances transport of gas or substrate to and from the biofilm. A high rate of substrate diffusion at the liquid/ biofilm interface and improved reaction rates can be achieved.

The rotational movement can additionally result in the erosion (shearing off, for example) of excessive biofilm growth, thus preventing blocking of the biofilm on the packing elements.

The effects are particularly enhanced if the packing elements float or are made of matter of such density that they are relatively easily entrained by fluid flow or formed into a fluidised bed by the flow of liquid and/or gas.

As noted above, sharp blade tips can create particularly high turbulence due to vortices spilling off their ends.

BRIEF DESCRIPTION OF THE DRAWINGS

The present invention will be further described by way of example only with reference to the accompanying drawings in which.

Figure 1:
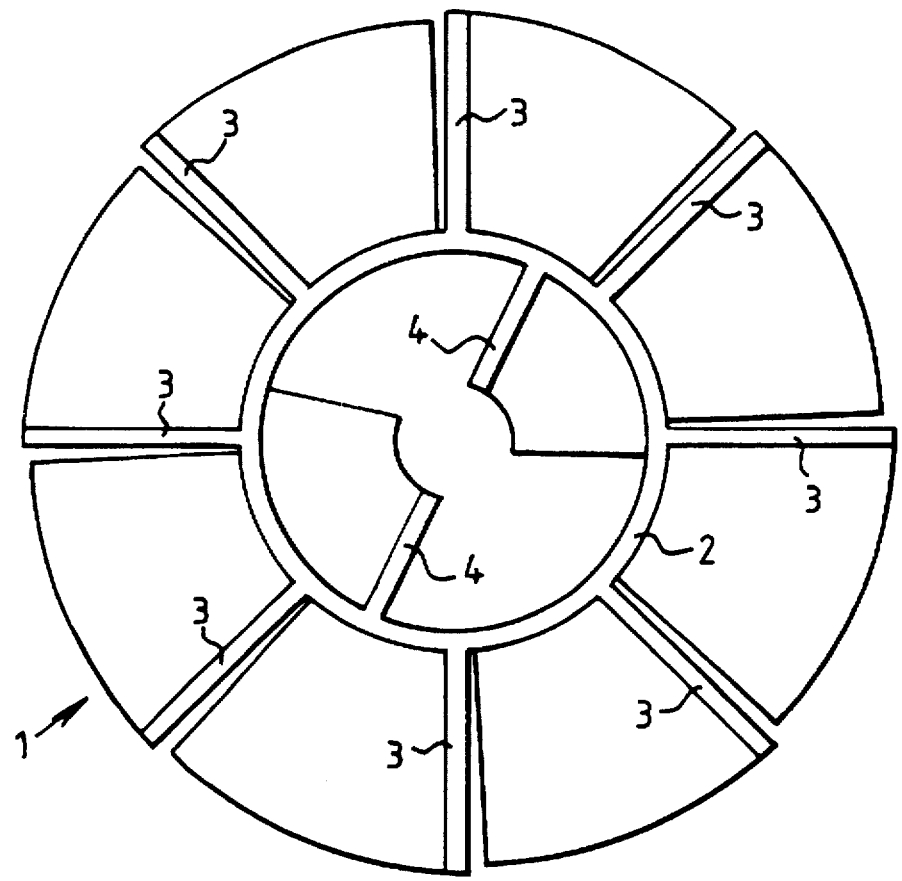
FIG. 1 is a plan view of packing element according to the present invention.
Figure 2:
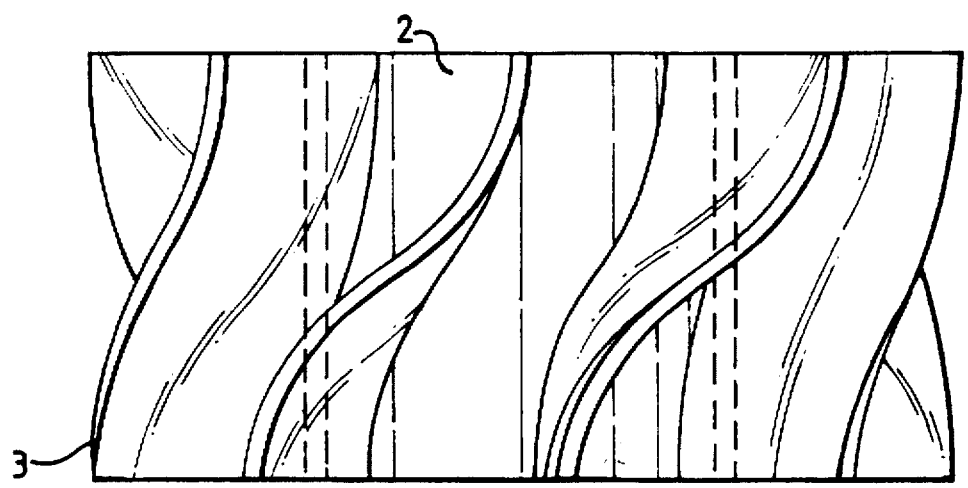
FIG. 2 is a side view of a packing element according to the present invention.

The packing element shown in FIGS. 1 and 2 is shown to scale.

DETAILED DESCRIPTION OF THE PREFERRED EMBODIMENTS

The packing element, indicated generally at 1, comprises a cylindrical body 2 defined by a short length parallel sided cylinder, there being blade members 3, 4 projecting radially therefrom. Some of the blade members 3 project radially outwardly from the cylindrical body 2, whereas others 4 project radially inwardly. As can be seen from FIG. 2, the blades 3 are helical, each blade 3, 4 lying on a helix which is coaxial with the cylindrical body 2. The angle of the helix to the axis is about 45°. The packing element will be from 10–150 mm in diameter, with the rest of the major dimensions in scale there with. The thickness of the material will, however, be constant at around 0.25–2 mm, when the packing element is constructed from polymeric material.

A plurality of such packing elements will be used in a method of liquid or water treatment as follows.

Figure 3:
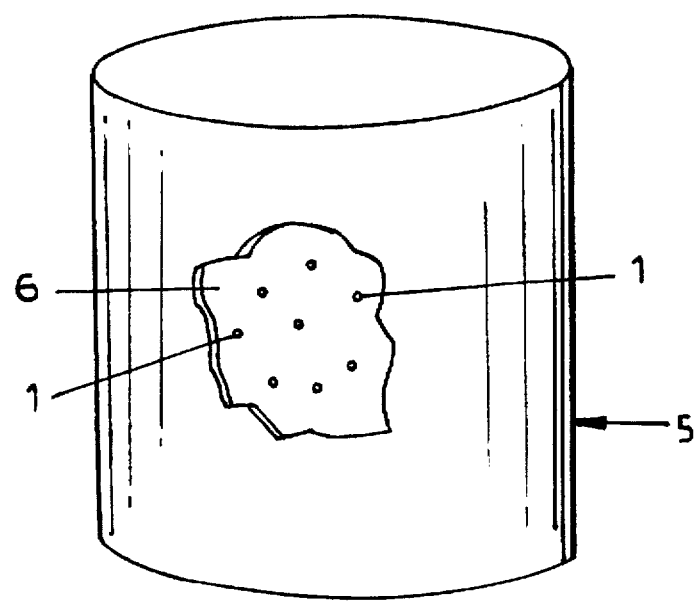
FIG. 3 is a diagrammatic perspective view, partially in cutaway, of a vessel containing a biological fluid and packing elements for processing the biological fluid.

A vessel 5, known as a bioreactor, is part filled with a large number of substantially identical packing elements shown in FIG. 3;

The packing elements 1 are seeded with bacterial or other microbial cultures before or after placement in the bioreactor 5, the culture being allowed to grow during the processing of liquid 6 in the vessel 5 so that it adheres to and covers the surfaces of the packing elements 1. The flow of the liquid and gas in the bioreactor 5 leads to a swirling motion of the packing elements 1 which enhances transport of substrate and gas to and away from the packing element 1 and the biofilm, giving enhanced rate of liquid processing.

The present invention has been described above purely by way of example, and modifications can be made within the spirit of the invention. The invention also consists in any individual features described or implicit herein or shown or implicit in the drawings or any combination of such features or generalisation of any such features or combination.

I claim:

1. A biological fluid processing apparatus comprising:
   a vessel for containing a flow of a biological fluid; and
   a plurality of packing elements disposed in the vessel for being in the contained flow of biological fluid and the packing elements being so disposed as to be rotatable in and with respect to the vessel, each packing element comprising a hollow cylindrical body having a plurality of blade members extending generally radially from the cylindrical body, the blade members being shaped and sized to impart rotational movement to the packing element by the flow of the biological fluid over the blade members.

2. The biological fluid processing apparatus of claim 1, wherein the packing elements are constructed of a material having a density which permits the packing elements to float in the biological fluid.

3. The biological fluid processing apparatus of claim 1, wherein the packing elements are constructed of a material having a density which permits the packing elements to be entrained by the flow of the biological fluid.

4. The biological fluid processing apparatus of claim 1, wherein the blade members lie at an angle to the central axis of the cylindrical body.

5. The biological fluid processing apparatus of claim 1, wherein the overall diameter of the packing elements is more than 10 mm and less than 150 mm.

6. The biological fluid processing apparatus of claim 1, wherein the packing elements are constructed of polymeric material.

7. The biological fluid processing apparatus of claim 1, wherein the blade members extend a radial distance which is more than 0.25 and less than 1.0 times the diameter of the cylindrical body.

8. The biological fluid processing apparatus of claim 1, wherein each packing element includes more than four and less than twelve blade members.

9. The biological fluid processing apparatus of claim 1, wherein at least one of the blade members extends generally radially outward from the cylindrical body.

10. The biological fluid processing apparatus of claim 1, wherein at least one of the blade members extends generally radially inward from the cylindrical body.

11. The biological fluid processing apparatus of claim 1, wherein the vessel is a bioreactor.

12. The biological fluid processing apparatus of claim 1, wherein a biofilm grows on the packing elements while the packing elements are in the biological fluid.

13. A biological fluid processing apparatus comprising:
   a vessel containing a flow of a biological fluid; and
   a plurality of packing elements disposed in the biological fluid in the vessel so as to be rotatable in and with respect to the vessel, each packing element comprising a hollow cylindrical body having a plurality of blade members extending generally radially from the cylindrical body, the blade members being shaped and sized to impart rotational movement to the packing element by the flow of the biological fluid over the blade members.

* * * * *